United States Patent [19]

Seeger et al.

[11] 3,928,364
[45] Dec. 23, 1975

[54] CARBOXYLIC ACID ESTERS OF 3-BIPHENYLYL-(BUTANOLS)

[75] Inventors: Ernst Seeger; Helmut Teufel; Wolfhard Engel; Gunther Engelhard, all of Biberach an der Riss, Germany

[73] Assignee: Boehringer Ingelheim GmbH, Ingelheim am Rhein, Germany

[22] Filed: June 11, 1974

[21] Appl. No.: 478,265

[30] Foreign Application Priority Data
June 16, 1973 Germany............................ 23308385

[52] U.S. Cl.... 260/295 R; 260/240 J; 260/295.5 R; 260/410.2; 260/469; 260/473 R; 260/475 R; 260/476; 260/488 CD; 424/266; 424/305; 424/308; 424/312
[51] Int. Cl.²....................................... C07D 213/55
[58] Field of Search............................. 260/295.5 R

[56] References Cited
UNITED STATES PATENTS
3,876,648   4/1975   Haas et al................... 260/295.5 R

*Primary Examiner*—Alan L. Rotman
*Attorney, Agent, or Firm*—Hammond & Littell

[57] ABSTRACT

Compounds of the formula

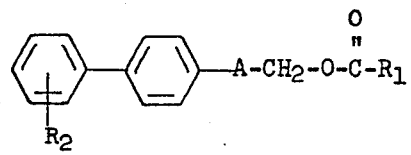

wherein $R_1$ is hydrogen, alkyl of 1 to 9 carbon atoms, cycloalkyl of 5 to 7 carbon atoms, cycloalkenyl of 5 to 7 carbon atoms, (alkyl of 1 to 3 carbon atoms)-(cycloalkyl of 5 to 7 carbon atoms), (alkyl of 1 to 3 carbon atoms)-(cycloalkenyl of 5 to 7 carbon atoms), phenyl, (alkyl of 1 to 3 carbon atoms)-phenyl, halophenyl, trifluoromethyl-phenyl, (alkoxy of 1 to 3 carbon atoms)-phenyl, phenyl-(alkyl of 1 to 3 carbon atoms), biphenylyl-(alkyl of 1 to 3 carbon atoms), (alkyl of 1 to 3 carbon atoms)-phenyl-(alkyl of 1 to 3 carbon atoms), halophenyl-(alkyl of 1 to 3 carbon atoms), (alkyl of 1 to 3 carbon atoms)-biphenylyl-(alkyl of 1 to 3 carbon atoms), 3-pyridyl, 4-pyridyl, [(alkyl of 1 to 3 carbon atoms)-(3-pyridyl)], [(alkyl of 1 to 3 carbon atoms)-(4-pyridyl)], or o-acetoxyphenyl, wherein
A is

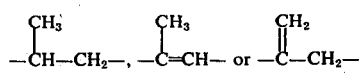

and
$R_2$ is hydrogen or halo, and
when $R_1$ contains a basic nitrogen,
a non-toxic, pharmacologically acceptable acid addition salt thereof; the compounds as well as their non-toxic, pharmacologically acceptable acid addition salts are useful as antiphlogistics.

4 Claims, No Drawings

CARBOXYLIC ACID ESTERS OF 3-BIPHENYLYL-(BUTANOLS)

This invention relates to novel carboxylic acid esters of 3-biphenylyl-(butanols or butenols), non-toxic, pharmacologically acceptable acid addition salts thereof, as well as to a process for preparing these compounds.

More particularly, the present invention relates to novel compounds of the formula

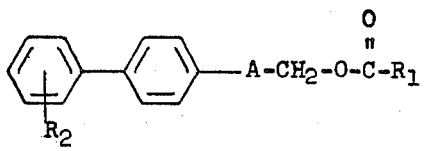

wherein
$R_1$ is hydrogen, alkyl of 1 to 9 carbon atoms, cycloalkyl of 5 to 7 carbon atoms, cycloalkenyl of 5 to 7 carbon atoms, (alkyl of 1 to 3 carbon atoms)-(cycloalkyl of 5 to 7 carbon atoms), (alkyl of 1 to 3 carbon atoms)-(cycloalkenyl of 5 to 7 carbon atoms), phenyl, (alkyl of 1 to 3 carbon atoms)-phenyl, halophenyl, trifluoromethyl-phenyl, (alkoxy of 1 to 3 carbon atoms)-phenyl, phenyl-(alkyl of 1 to 3 carbon atoms), biphenylyl-(alkyl of 1 to 3 carbon atoms), (alkyl of 1 to 3 carbon atoms)-phenyl-(alkyl of 1 to 3 carbon atoms), halophenyl-(alkyl of 1 to 3 carbon atoms), (alkyl of 1 to 3 carbon atoms)-biphenylyl-(alkyl of 1 to 3 carbon atoms), halobiphenylyl-(alkyl of 1 to 3 carbon atoms), 3-pyridyl, 4-pyridyl, (alkyl of 1 to 3 carbon atoms)-(3-pyridyl), (alkyl of 1 to 3 carbon atoms)-(4-pyridyl), or o-acetoxyphenyl,
wherein
A is

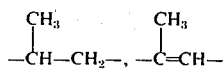

or

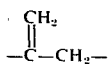

and
$R_2$ is hydrogen or halo, and
when $R_1$ contains a basic nitrogen, non-toxic, pharmacologically acceptable acid addition salts thereof.

A particularly preferred subgenus of the compounds according to the present invention are those compounds of the formula

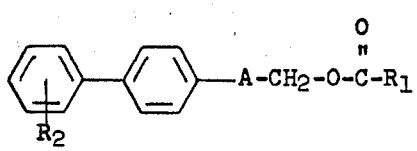

where
$R_1$ is hydrogen, alkyl of 1 to 9 carbon atoms, phenyl, biphenylyl-(alkyl of 1 to 3 carbon atoms), 3-pyridyl, 4-pyridyl, tert.butyl, or o-acetoxyphenyl,
A is

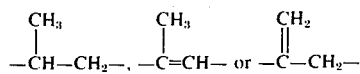

and
$R_2$ is fluorine or chlorine, and
when $R_1$ contains a basic nitrogen, non-toxic, pharmacologically acceptable acid addition salts thereof.

The novel compounds embraced by formula I may be prepared by the following processes:

Method A

By esterifying a 3-94'-biphenylyl)-carbinol of the formula

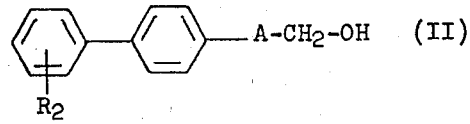

wherein
$R_2$ and A have the same meanings as defined above.

The esterification is performed by reaction of compounds of the formula II with carboxylic acids of the formula

wherein
$R_1$ has the same meanings as defined above.

The esterification is preferably carried out in the presence of an organic solvent at elevated temperatures, preferably at temperatures above 60°C, optionally up to the boiling point of the solvent used. Examples of solvents especially include benzene, toluene, xylene, chloroform or other halogenated aliphatic hydrocarbons, for example, ethylene chloride. It is advantageous, if the water formed is removed by means of azeotropic distillation. Dehydrating agents, such as potassium pyrosulfate may also be used. Favorable results are also obtained, if acidic catalysts are used, for example, toluenesulfonic acid, hydrogen chloride, sulfuric acid, phosphoric acid or thionyl chloride. An excess of lower aliphatic carboxylic acids of formula III, for example, formic acid or acetic acid, is preferably used without further solvents.

Method B

By reacting a carboxylic acid anhydride of the formula

wherein
$R_1$ has the same meanings as defined above, and
$R_1'$ has the same meanings as defined above for $R_1$, except that $R_1'$ cannot be hydrogen, with a carbinol of formula II.

The reaction is performed at temperatures between 20° and 150°C, preferably in an organic solvent such as benzene, toluene, xylene, ethylene chloride or pyridine. An excess of the carboxylic acid anhydride of formula IV may also be used as solvent, especially when this carboxylic acid anhydride is low-molecular.

Compounds of formula IV,
where
R₁ is hydrogen and
R₁' is lower alkyl or aralkyl
may also be used as starting materials. Such a mixed anhydride is reacted with a carbinol of formula II at temperatures between 0° and 60°C in the presence of a solvent such as benzene, toluene or diethylether.

Method C

By reacting a carboxylic acid halide of the formula

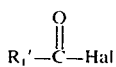

$$R_1'-\overset{O}{\underset{\|}{C}}-Hal \qquad (V)$$

wherein
R₁' has the same meanings as defined above for R₁ except that R₁' cannot be hydrogen, and
Hal is halogen, preferably chlorine or bromine,
with an alcohol of formula II or with an alkali metal salt or an alkaline earth metal salt of an alcohol of the formula

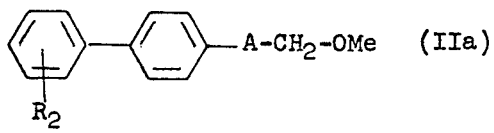

wherein
R₂ and A have the same meanings as defined above
and
M is an alkali metal or an equivalent amount of an alkaline earth metal.

The reaction with an alcohol of formula II is preferably carried out in the presence of an organic solvent at temperatures between 20° and 150² C. Examples of suitable solvents are benzene, toluene, a chlorinated aliphatic hydrocarbon, an aliphatic ether or a cyclic ether. The reaction proceeds at temperatures between 0° and 80°C, if a tertiary organic base is present, since the tertiary organic base may at the same time serve as solvent. Examples of suitable tertiary organic bases are for example triethylamine or pyridine.

The reaction with a salt of formula IIa is preferably carried out in the presence of an organic solvent at temperatures between 0° and 150°C. Examples of suitable solvents are benzene, toluene, xylene, an aliphatic straight ether or an aliphatic cyclic ether.

If compounds of formula I are prepared according to methods A, B or C, wherein A is

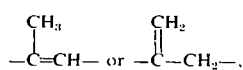

these groups may, if desired, be subsequently converted into such esters of formula I, wherein A is

by reduction. This reduction is carried out, for example, by means of catalytically activated hydrogen by use of a noble metal catalyst, such as platinum oxide, at room temperature and at a pressure of 0.1 to 10 atm. in the presence of an inert solvent. Examples of inert solvents especially include carbinols, such as ethanol, propanol, butanol or isopropanol.

The carbinols of formula II used as starting compounds may be prepared by reduction of compounds of the formula

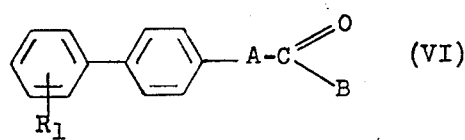

wherein
R₁ and A have the same meanings as defined above, and
B is hydroxy, alkoxy, aralkoxy, aryloxy, acyloxy or halogen.

The reduction is performed by means of complex hydrides, preferably by means of lithium aluminum hydride, lithium borohydride or alkoxy aluminum hydrides, for example, sodium-bis-(2-methoxyethoxy)-dihydroaluminate. Sodium borohydride together with anhydrous aluminum chloride or with boron trifluoride may also be used. If B is halogen, sodium borohydride may also be used alone. The reduction is performed in a suitable solvent such as tetrahydrofuran, ether, dimethoxyethane, diethyleneglycolether or benzene, at temperatures between 0°C and the boiling point of the solvent, preferably between 0° and 30° C.

The compounds of formula VI may be prepared by reaction of a known ketone of the formula

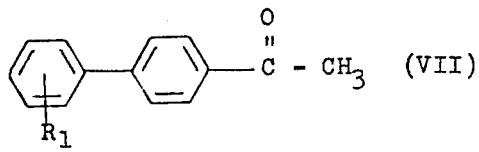

wherein
R₁ has the same meanings as defined above with the zinc compound of a corresponding halogen acetic acid ester. The reaction may, for example, be carried out in an etheric solution at temperatures of preferably 20° to 30°C. First esters of formula VI are formed, wherein A is

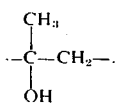

These compounds may subsequently be converted into the compounds of formula VI by dehydration, wherein A is

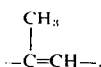

Examples of dehydrating agents include acidically reacting salts, for example, the salts of pyridine or of the alkyl pyridines with hydrohalic acids.

Compounds of formula VI, wherein A is

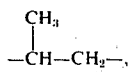

may for example be obtained by reduction of the above mentioned compounds of formula VI, wherein A is

and B is not halogen. The reduction may be carried out catalytically, in which a noble metal oxide, such as platinum oxide, is used as the catalyst. The reaction is preferably carried out in a solvent, for example, in methanol or ethanol, at temperatures between 20° and 100°C and at a pressure between 1 and 100 atmospheres.

The preparation of compounds of formula II is described in copending U.S. Pat. application Ser. No. 387,802, filed Aug. 15, 1973, now U.S. Pat. No. 3,859,256 dated Jan. 7, 1975.

The starting compounds of formulas III and V are known from the literature and may easily be prepared according to methods known from the literature. The symmetric carboxylic acid anhydrides of general formula IV are also known from the literature and may be prepared according to methods described in the literature. The alkanoic acid-formic acid anhydrides of formula IV may be prepared according to different methods, and may easily be prepared, for example, according to the method of R. Schijf and W. Stevens, Rec. Trav. chim. Pays-Bas 85, 627 (1966).

The following examples further illustrate the present invention and will enable others skilled in the art to understand it more completely. It should be understood, however, that the invention is not limited solely to the particular examples given below.

EXAMPLE 1

[3-(2'-Fluoro-4''-biphenylyl)-1-butyl]perlargonate by method A 6.1 gm (0.025 mol) of 3-(2'-fluoro-4''-biphenylyl)-1-butanol and 4.2 gm (0.027 mol) of pelargonic acid were refluxed in 50 ml of absolute toluene while adding 0.25 gm of p-toluenesulfonic acid using an apparatus incorporating a water separator funnel. After all the water had been separated, the mixture was diluted with ether, the organic solution was extracted with water, dilute ammonia and again with water, dried over sodium sulfate and the solvent was distilled off. The yield of 6 gm was 62.5% of theory of [3-(2'-fluoro-4''-biphenylyl)-1-butyl] pelargonate of the formula

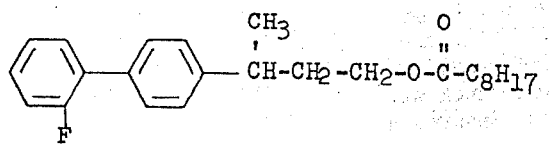

with a boiling point of 184°–187°C at 0.1 mm Hg.

EXAMPLE 2

Using a procedure analogous to that described in Example 1, [3-(2'-fluoro-4''-biphenylyl)-1-butyl] caprylate, boiling point of 180°–183°C at 0.15 mm Hg, was prepared in a yield of 6.2 gm (67.5% of theory), from 3.9 gm (0.027 mol) of caprylic acid and 6.1 gm (0.025 mol) of 3-(2'-fluoro-4''-biphenylyl)-1-butanol, and had the formula

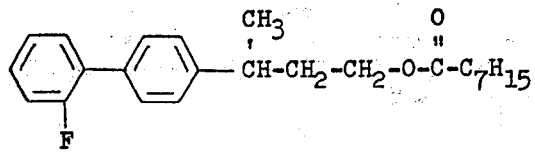

EXAMPLE 3

[3-(2'-Fluoro-4''-biphenylyl)-1-butyl] isonicotinate and its hydrochloride by method B 13.7 gm (0.06 mol) of isonicotinic acid anhydride were added while stirring into a solution of 12.2 gm (0.05 mol) of 3-(2'-fluoro-4''-biphenylyl)-1-butanol in 50 ml of absolute pyridine. The mixture was heated for 1.5 hours at 50°C, water was added and the mixture was extracted with ethyl acetate. After drying of the organic solution, the solvent was distilled off. The remaining crude ester was distilled in vacuo, whereupon 10.5 gm (60% of theory) of the ester was obtained of b.p. 191°–194°C at 0.05 mm Hg, which crystallized and melted at 71°–72°C after trituration with petroleum ether. The hydrochloride, which had precipitated after addition of a solution of hydrogen chloride in ether, melted at 131°–133°C (ethyl acetate), and had the formula

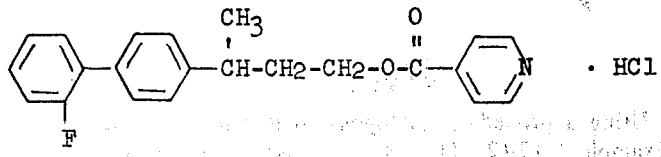

EXAMPLE 4

Using a procedure analogous to that described in Example 1, [3-(2'-fluoro-4''-biphenylyl)-1-butyl] benzoate, boiling point of 183°–186°C at 0.05 mm Hg, was prepared in a yield of 6 gm (73% of theory) from 6.1 gm (0.025 mol) of 3-(2'-fluoro-4''-biphenylyl)-1-butanol, 6.2 gm (0.043 mol) of benzoic acid and 0.5 gm of p-toluenesulfonic acid which were refluxed in 40 ml of toluene using an apparatus incorporating a water separator funnel until all the water had been separated. The ester had the formula

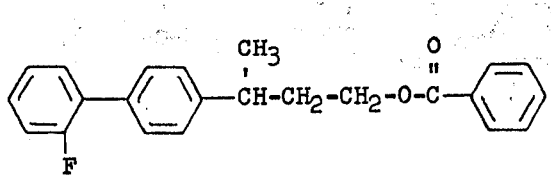

EXAMPLE 5

Using a procedure analogous to that described in Example 3, [3-(2'-fluoro-4''-biphenylyl)-1-butyl] propionate, boiling point 135°–137°C at 0.05 mm Hg, was prepared in a yield of 6 gm (80% of theory) from 5.9 gm (0.045 mol) of propionic acid anhydride which was added while stirring into a solution of 6.1 gm (0.025 mol) of 3-(2'-fluoro-4''-biphenylyl) -1-butanol in 40 ml of absolute pyridine and the mixture was heated for 4.5 hours at 50°C. The ester had the formula

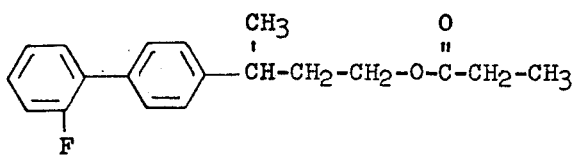

EXAMPLE 6

[3-(2'-Fluoro-4''-biphenylyl)-1-butyl] isobutyrate by method C 2.6 gm (0.025 mol) of isobutyric acid chloride were added while stirring into 6.1 gm (0.025 mol) of 3-(2'-fluoro-4''-biphenylyl)-1-butanol, whereby the mixture heated itself. After stirring the reaction mixture for 1 hour at 40°C, ether was added. The solvent was distilled off from the etheric solution, after it had been washed with water and dried. The yield of 4.5 gm was 57.2% of theory of [3-(2'-fluoro-4''-biphenylyl)-1-butyl] isobutyrate, boiling point of 139°–140°C at 0.08 mm Hg, of the formula

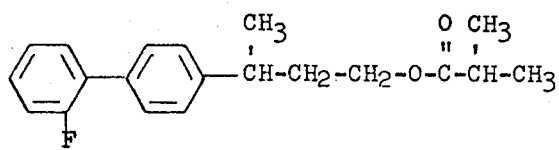

EXAMPLE 7

Using a procedure analogous to that described in Example 3, [3-(2'-chloro-4''-biphenylyl)-1-butyl] nicotinate and its hydrochloride, were prepared from 3.9 gm (0.022 mol) of nicotinic acid chloride hydrochloride which was added while stirring into a solution of 5.2 gm (0.02 mol) of 3-(2'-chloro-4''-biphenylyl)-1-butanol in 25 ml of absolute pyridine, and the mixture was heated for 3 hours at 50°C. The yield of 5 gm was 68.5% of theory of the ester, [3-(2'-chloro-4''-biphenylyl)-1-butyl] nicotinate, of b.p. 215°–219°C at 0.3 mm Hg and of m.p. 87°–89°C (diisopropylether). The addition of a solution of hydrogen chloride in ether produced the hydrochloride, m.p. 159°–161°C (ethyl acetate) which had the formula

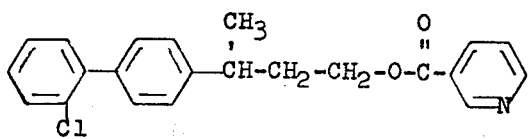

· HCl

EXAMPLE 8

Using a procedure analogous to that described in Example 3, [3-(2'-chloro-4''-biphenylyl)-1-butyl] isonicotinate and its hydrochloride were prepared from 5.7 gm (0.025 mol) of isonicotinic acid anhydride which was added while stirring into a solution of 5.2 gm (0.02 mol) of 3-(2'-chloro-4''-biphenylyl)-1-butanol in 25 ml of absolute pyridine, and the mixture was heated at 50°C for 2 hours. The yield of 6.2 gm was 85% of theory of the ester, [3-(2'-chloro-4''-biphenylyl)-1-butyl] isonicotinate, m.p. 85°–86°C (recrystallized from petroleum ether). The addition of a solution of hydrogen chloride in ether produced the hydrochloride of m.p. 131°C (ethyl acetate).

EXAMPLE 9

Using a procedure analogous to that described in Example 6, [3-(2'-chloro-4''-biphenylyl)-1-butyl] isobutyrate, boiling point of 150°C at 0.1 mm Hg, was prepared in a yield of 5 gm (75.7% of theory) from a solution of 5.2 gm (0.02 mol) of 3-(2'-chloro-4''-biphenylyl)-1-butanol and 2.3 gm (0.022 mol) of isobutyric acid chloride in 10 ml of benzene which was heated at 50°C while stirring for 3 hours.

EXAMPLE 10

Using a procedure analogous to that described in Example 3, [3-(2'-fluoro-4''-biphenylyl)-2-butene-1-yl] isonicotinate, m.p. 77°–78°C (from petroleum ether/cyclohexane), was prepared in a yield of 6 gm (69% of theory) from 6.8 gm (0.03 mol) of isonicotinic acid anhydride which was added while stirring into a solution of 6 gm (0.025 mol) of 3-(2'-fluoro-4''-biphenylyl)-2-butene-1-ol in 50 ml of absolute pyridine, and the mixture was heated at 50°C for 2 hours. The ester had the formula

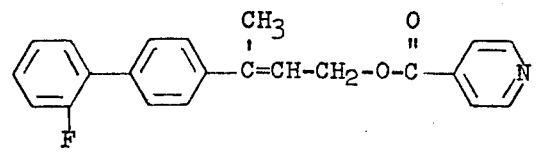

EXAMPLE 11

Using a procedure analogous to that described in Example 3, [3-(2'-fluoro-4''-biphenylyl)-2-butene-1-yl] propionate, m.p. 48°–50°C (from petroleum ether), was prepared in a yield of 4.5 gm (60.4% of theory) from 3.9 gm (0.030 mol) of propionic acid anhydride which was added while stirring into a solution of 6 gm (0.025 mol) of 3-(2'-fluoro-4''-biphenylyl)-2-butene-1-ol in 50 ml of absolute pyridine, and the mixture was heated up to 50°C for 2 hours.

EXAMPLE 12

Using a procedure analogous to that described in Example 1, [3-(2'-fluoro-4''-biphenylyl)-1-butyl]-4'''-biphenylyl -acetate, boiling point 250°–255°C at 0.15 mm Hg, was prepared in a yield of 6 gm (54.7% of theory) from 6.1 gm (0.025 mol) of 3-(2'-fluoro-4''-biphenylyl)-1-butanol, 5,3 gm (0.025 mol) of 4-biphenylyl)-acetic acid and 0.5 gm of p-toluene-sulfonic acid which were refluxed in 50 ml of toluene using an apparatus incorporating a water separator funnel, until all the water had been separated. The ester had the formula

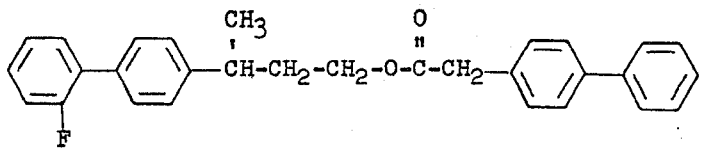

EXAMPLE 13

Using a procedure analogous to that described in Example 6, [3-(2'-fluoro-4''-biphenylyl)-1-butyl] valerate, b.p. 157°–159°C at 0.1 mm Hg, was prepared in a yield of 13 gm (79.3% of theory) from 12.2 gm (0.05 mol) of 3-(2'-fluoro-4''-biphenylyl)-1-butanol and 6.6 gm (0.055 mol) of valeric acid chloride which were heated, while stirring, in 50 ml of benzene at 50°C for 2 hours. The ester had the formula

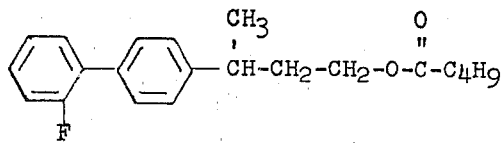

EXAMPLE 14

Using a procedure analogous to that described in Example 3, [3-(2'-fluoro-4''-biphenylyl)-1-butyl] acetate, boiling point of 135°C at 0.1 mm Hg, was prepared in a yield of 10.5 gm (73.5% of theory) from 9.2 gm (0.09 mol) of acetic acid anhydride which was added, while stirring, to a solution of 12.2 gm (0.05 mol) of 3-(2'-fluoro-4''-biphenylyl)-1-butanol in 100 ml of absolute pyridine, and the mixture was heated for 3 hours at 50°C.

EXAMPLE 15

Using a procedure analogous to that described in Example 6, [3-(2'-chloro-4''-biphenylyl)-1-butyl] valerate, boiling point of 175°C at 0.3 mm Hg, was prepared in a yield of 8.5 gm (82.5% of theory) from 7.8 gm (0.03 mol) of 3-(2'-chloro-4''-biphenylyl)-1-butanol and 4.0 gm (0.033 mol) of valeric acid chloride which were heated in 50 ml of benzene at 50°C for 4 hours.

EXAMPLE 16

Using a procedure analogous to that described in Example 3, [3-(2'-chloro-4''-biphenylyl)-1-butyl] propionate, boiling point of 154°C at 0.07 mm Hg, was prepared in a yield of 6.5 gm (82.5% of theory) from 5.9 gm (0.045 mol) of propionic acid anhydride which was added, while stirring, to a solution of 6.5 gm (0.025 mol) of 3-(2'-chloro-4''-biphenylyl)-1-butanol in 40 ml of absolute pyridine, and the mixture was heated at 50°C for 3 hours.

EXAMPLE 17

[3-(2'-Chloro-4''-biphenylyl)-1-butyl] formate by method A

A solution of 10.0 gm (0.038 mol) of 3-(2'-chloro-4''-biphenylyl)-1-butanol in 50 ml (about 1.3 mol) of formic acid was refluxed for 8 hours. The reaction mixture was evaporated, toluene was added several times, and distilled off. The residue was taken up in ether and washed neutral with water. The solution was dried and evaporated. The remaining product was distilled in a medium high vacuum, producing 10.2 gm of the ester, [3-(2'-chloro-4''-biphenylyl)-1-butyl] formate, a liquid oil of b.p. 136°–142°C at 0.07 mm Hg, in a yield of 94% of theory.

EXAMPLE 18

[3-(2'-Chloro-4''-biphenylyl)-1-butyl] acetate by method C 3.9 gm (0.050 mol) of acetyl chloride, dissolved in 20 ml of absolute toluene, were added at room temperature to a solution of 10.0 gm (0.038 mol) of 3-(2'-chloro-4''-biphenylyl)-1-butanol and 5.0 gm (0.05 mol) of triethylamine in 100 ml of absolute toluene. The mixture was stirred for a few hours and subsequently heated at 100°C for 1 hour. After cooling, water was added; the toluene layer was separated and the aqueous layer was extracted with ether. The organic solutions were washed neutral, dried and evaporated. The residue was distilled in a medium high vacuum, and 8.9 gm of the ester, [3-(2'-chloro-4''-biphenylyl)-1-butyl] acetate, were obtained as a colorless oil of b.p. 147°–150°C at 0.06 mm Hg in a yield of 77% of theory.

EXAMPLE 19

[3-(2'-Chloro-4''-biphenylyl)-1-butyl]-o-acetylsalicyl by method C

A solution of 8.3 gm (0.042 mol) of o-acetylsalicylic acid chloride, b.p. 133°–134°C at 1.0 mm Hg in 50 ml of dry benzene was added dropwise within 30 minutes to a solution of 9.8 gm (0.0375 mol) of 3-(2'-chloro-4''-biphenylyl)-1-butanol and 4.3 gm (0.042 mol) of triethylamine in 100 ml of dry benzene. The mixture was stirred for 5.5 hours at laboratory temperature and then refluxed for 2 hours. After cooling, the precipitated triethylamine hydrochloride was vacuum filtered and washed with ether. The filtrate was extracted with dilute hydrochloric acid, sodium bicarbonate solution and water. The organic portion was dried, evaporated and distilled, yielding 13 gm which was 82% of theory of [3-(2'-chloro-4''-biphenylyl)-1-butyl]-o-acetylsalicylate, b.p. 211°C at 0.05 mm Hg, of the formula

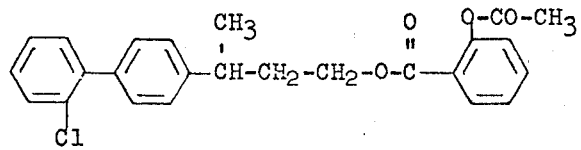

EXAMPLE 20

[3-(2'-Fluoro-4''-biphenylyl)-1-butyl] pivalate by method C

A solution of 6.6 gm (0.066 mol) of pivaloyl chloride in 50 ml of dry benzene was added dropwise within 20 minutes to a solution of 14.6 gm (0.06 mol) of 3-(2'-fluoro-4''-biphenylyl)-1-butanol and 6.7 gm (0.066 mol) of triethylamine in 100 ml of dry benzene. The mixture was stirred for 5 hours at laboratory temperature and then refluxed for 2.5 hours. After cooling, the triethylamine hydrochloride was filtered off and washed with ether. The filtrate was extracted with dilute hydrochloric acid, sodium bicarbonate solution and water. The organic portion was dried, evaporated and distilled, yielding 14.1 gm (71.6% of theory) of [3-(2'-fluoro-4''-biphenylyl)-1-butyl] pivalate, b.p. 136°–138°C at 0.05 mm Hg, of the formula

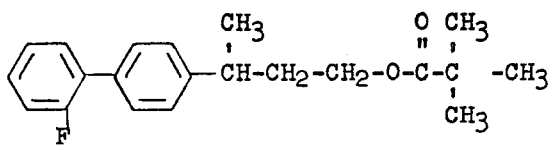

EXAMPLE 21

[3-(2'-Fluoro-4''-biphenylyl)-2-butene-1-yl]-benzoate by method C 6 gm (0.025 mol) of 3-(2'-fluoro-4''-biphenylyl)-2-butene-1-ol were dissolved in 15 ml of absolute pyridine and 4.2 gm (0.03 mol) of benzoylchloride were added dropwise while stirring. Afterwards, stirring was continued for 1 hour at 40°C; ether was added and the etheric solution was extracted with water, dilute hydrochloric acid and again with water. After drying over sodium sulfate, the solvent was distilled off and the remaining residue was distilled in a medium high vacuum. The yield was 3 gm (34.7% of theory) of the ester, [3-(2'-fluoro-4''-biphenylyl)-2-butene-1-yl] benzoate, b.p. 215°–217°C at 0.2 mm Hg, which crystallized and melted at 64°–66°C after recrystallization from petroleum ether.

The compounds according to the present invention or the non-toxic, pharmacologically acceptable acid addition salts thereof, embraced by formula I above, have useful pharmacodynamic properites. More particularly, the compounds of the present invention exhibit antiphlogistic activity in warm-blooded animals, such as rats.

The pharmacodynamic activity of the compounds of the present invention, namely their antiphlogistic activity, was ascertained in the manner described below. While all of these compounds were found to have this above effective activity, some illustrative test results are shown in the table, wherein A = [3-(2'-fluoro-4''-biphenylyl)-1-butyl] isonicotinate, B = [3-(2'-fluoro-4''-biphenylyl)-1-butyl] perlargonate, C = [3-(2'-chloro-4''-biphenylyl)-1-butyl] nicotinate, and D = [3-(2'-fluoro-4''-biphenylyl)-2-butene-1-yl]isonicotinate.

The compounds embraced by formula I were tested to determine their antiexsudative effect on the kaolin-induced edema and the carrageenin-induced edema of the hind paw of the rat, and to determine their acute toxicity after oral administration in rats. The results were compared with those given by phenylbutazone, a known compound.

a. Kaolin-induced edema of the hind paw of the rat

The kaolin edema was induced according to the method given by Hillebrecht (Arzneimittel-Forsch. 4, 607 (1954)) by subcutaneous injection of 0.05 ml of a 10% suspension of kaolin in a 0.85% sodium chloride solution. Measurement of the thickness of the paws was effected using the technique of Doepfner and Cerletti (Int. Arch. Allergy Immunol. 12, 89 (1958)).

The compound being tested was administered orally to male FW 49 rats of a weight of 120 to 150 gm by means of an esophageal tube 30 minutes before inducing the edema. 5 hours after the provocation of the edema, the average size of the swelling in the rats treated with the test compound was compared with the size of the swelling in the control animals treated by a control procedure. By graphical extrapolation, the dose leading to a 35% reduction of the swelling ($ED_{35}$) was calculated from the percentage reduction in the size of the swelling caused by the administration of different doses.

b. Carrageenin-induced edema of the hind paw of the rat

The provocation of the carageenin edema was effected according to the method of Winter et al (Proc. Soc. Exp. Biol. Med. 111, 544 (1962)) by subcutaneous injection of 0.05 ml of a 1% solution of carrageenin in a 0.85% solution of sodium chloride. The test compounds were administered 60 minutes before the provocation of the edema.

For the calculation of the reductive effect on the edema, the size of the swelling was measured 3 hours after the provocation of the edema. All the other details were the same as described above in the case of the kaolin edema.

c. Acute toxicity

The acute toxicity ($LD_{50}$) was determined after oral administration to male and female FW 49 rats (ratio 1:1) having an average weight of 135 gm. The compounds were administered as a trituration in tylose. The calculation of the $LD_{50}$ values was effected, as far as possible, according to the method of Litchfield and Wilcoxon, based on the percentage of animals which died within 14 days after administration of the different doses.

d. The therapeutic index

The therapeutic index (a measure of the therapeutic usefulness) was calculated as the quotient of the $LD_{50}$ value and the average $ED_{35}$ value derived from the tests to determine the antiexsudative activity for kaolin induced edemas and carrageenin induced edemas.

The results obtained from these tests are shown in the Table. The antiphlogistic activity of the compounds embraced by formula I is superior to that of phenylbutazone.

Since the toxicity does not run parallel with the antiphlogistic activity, the compounds according to the invention have a therapeutic index of at least twice that of phenylbutazone.

TABLE

| Compound | Kaolin edema $ED_{35}$ per os mgm/kg | Carrageenin edema $ED_{35}$ per os mgm/kg | Average value $ED_{35}$ mgm/kg | Acute toxicity in the rat $LD_{50}$ mgm/kg | Therapeutic index Ratio given by the toxic and antiexsudative activity $LD_{50} / ED_{35}$ |
| --- | --- | --- | --- | --- | --- |
| Phenylbutazone | 58 | 69 | 63.5 | 864 (793 – 942) | 13.6 |
| A | 11.5 | 13.0 | 12.3 | 910 (664 – 1247) | 74.0 |
| B | 22.5 | 9.6 | 16.1 | 720 (550 – 943) | 44.7 |
| C | 15.5 | 12.5 | 14 | >4000 (1/10 +) | > 286 |
| D | 12.0 | 8.7 | 10.4 | 825 (665 – 1023) | 79.3 |

For pharmaceutical purposes the compounds according to the present invention are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective single dosage unit of the compounds according to the present invention is from 0.83 to 6.67 mgm/kg body weight, preferably 1.67 to 6.0 mgm/kg body weight. One effective daily dosage unit of the compounds according to the present invention is from 1.67 to 16.7 mgm/kg body weight, preferably 2.5 to 10.0 mgm/kg body weight. The compounds according to the present invention may optionally be used in combination with other active ingredients embraced by formula I above.

The following examples illustrate a few pharmaceutical dosage unit compositions comprising a compound of the present invention as an active ingredient and represent the best modes contemplated of putting the invention into practical use. The parts are parts by weight unless otherwise specified.

EXAMPLE 22

Tablets

The tablet composition was compounded from the following ingredients:

| | |
| --- | --- |
| [3-(2'-Fluoro-4''-biphenylyl)-1-butyl] isonicotinate | 50.0 parts |
| Corn starch | 197.0 parts |
| Polyvinyl pyrrolidone | 10.0 parts |
| Magnesium stearate | 3.0 parts |
| Total | 260.0 parts |

Preparation

The mixture of active ingredient with corn starch was granulated by passing through a 1.5 mm screen with an aqueous 14% solution of polyvinylpyrrolidone, dried at 45°C and again passed through the said screen. The granulate thus prepared was admixed with magnesium stearate and compressed into 260 mgm tablets. Each tablet contained 50 mgm of the ester compound, and was an oral dosage unit composition with effective antiphlogistic activity.

EXAMPLE 23

Coated tablets

The tablet core composition was compounded from the following ingredients:

| | |
| --- | --- |
| [3-(2'-Fluoro-4''-biphenylyl)-1-butyl] benzoate | 100.0 parts |
| Corn starch | 170.0 parts |
| Gelatin | 8.0 parts |
| Talcum | 18.0 parts |
| Magnesium stearate | 4.0 parts |
| Total | 300.0 parts |

Preparation

A mixture of the active ingredient with corn starch was granulated by passing it through a 1.5 mm screen with an aqueous 10% solution of the gelatin, dried at 45°C, and again passed through said screen. The granulate obtained was admixed with talcum and magnesium stearate and compressed to form the tablet cores, each having a weight of 300 mgm. The tablet cores were coated in known manner with a coating primarily of sugar and talcum and then polished with beeswax. Each coated tablet weighed 580 mgm and contained 100 mgm of the ester compound, and was an oral dosage unit composition with effective antiphlogistic activity.

EXAMPLE 24

Gelatin capsules

The capsule contents were compounded from the following ingredients:

| | |
| --- | --- |
| [3-(2'-Chloro-4-biphenylyl)-1-butyl] nicotinate | 100.0 parts |
| Corn starch | 290.0 parts |
| Colloidal silicic acid | 6.0 parts |
| Magnesium stearate | 4.0 parts |
| Total | 400.0 parts |

Preparation

The ingredients were homogeneously admixed and 400 mgm portions were filled into size No. 1 gelatin capsules. Each gelatin capsule contained 100 mgm of the ester compound and was an oral dosage unit composition with effective antiphlogistic activity.

EXAMPLE 25

Suppositories

The suppository composition was compounded from the following ingredients:

| | |
| --- | --- |
| [3-(2'-Fluoro-4''-biphenylyl)-1-butyl] pelargonate | 100.0 parts |
| Suppository base (e.g. cocoa butter) | 1650.0 parts |
| Total | 1750.0 parts |

Preparation

The active ingredient was finely powdered and stirred into the molten suppository base at 40°C, using an immersion homogenizer. 1750 mgm portions of the mixture at 38°C were poured into cooled suppository molds and allowed to cool therein. Each suppository contained 100 mgm of the ester compound and was a rectal dosage unit composition with effective antiphlogistic activity.

EXAMPLE 26

Suspension

The suspension was compounded from the following ingredients:

| | | |
|---|---|---|
| [3-(2'-Fluoro-4''-biphenylyl)-2-butene-1-yl] isonicotinate | 4.0 | parts |
| Dioctyl sodium sulfosuccinate (DONSS) | 0.02 | parts |
| Benzoic acid | 0.1 | parts |
| Sodium cyclamate | 0.2 | parts |
| Colloidal silicic acid | 1.0 | parts |
| Polyvinyl pyrrolidone | 0.1 | parts |
| Glycerol | 25.0 | parts |
| Flavoring | 0.1 | parts |
| Distilled water   q.s.ad | 100.0 | parts by vol. |

Preparation

The DONSS, benzoic acid, sodium cyclamate and polyvinyl pyrrolidone were successively dissolved in water which had been heated to 70°C. The glycerol and colloidal silicic acid were then added, and the mixture was cooled to room temperature. The finely powdered active ingredient was then suspended in the mixture by means of an immersion homogenizer. The flavoring was added to the suspension which was then diluted with distilled water to the indicated volume. Each 2.5 ml of the suspension contained 100 mgm of the ester compound and was an oral dosage unit composition with effective antiphlogistic activity.

Analogous results are obtained when any one of the other compounds embraced by formula I or a non-toxic, pharmacologically acceptable acid addition salt thereof is substituted for the particular ester in Examples 22 through 26. Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A compound of the formula

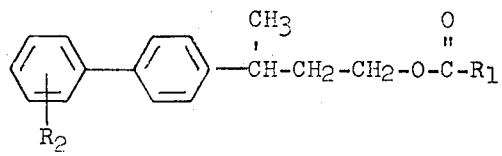

wherein
$R_1$ is 3-pyridyl, 4-pyridyl, [(alkyl of 1 to 3 carbon atoms)-3-pyridyl]or [(alkyl of 1 to 3 carbon atoms)-4-pyridyl], and
$R_2$ is hydrogen or halogen,
or a non-toxic, pharmacologically acceptable acid addition salt thereof.

2. A compound of claim 1,
where
$R_1$ is 3-pyridyl or 4-pyridyl, and
$R_2$ is fluorine or chlorine,
or a non-toxic, pharmacologically acceptable acid addition salt thereof.

3. A compound according to claim 2, which is [3-(2'-fluoro-4''-biphenylyl)-1-butyl] isonicotinate, or a non-toxic, pharmacologically acceptable acid addition salt thereof.

4. The compound according to claim 2, which is [3-(2'-chloro-4''-biphenylyl)-1-butyl] nicotinate, or a non-toxic, pharmacologically acceptable acid addition salt thereof.

* * * * *

PO-1050
(5/69)

UNITED STATES PATENT OFFICE
CERTIFICATE OF CORRECTION

Patent No. 3,928,364   Dated December 23, 1975

Inventor(s) ERNST SEEGER, HELMUT TEUFEL, WOLFHARD ENGEL, GUNTHER ENGELHARDT

It is certified that error appears in the above-identified patent and that said Letters Patent are hereby corrected as shown below:

In the abstract in the 13th line after the formula after "atoms)" -- halobiphenylyl- (alkyl of 1 to 3 carbon atoms)- -- should be inserted In Col. 2, Line 19   "3-94'" should read -- 3-(4' --

In Col. 3, Line 47   "1502 C" should read -- 150°C --

In Col. 8, Line 65   "5,3" should read -- 5.3 --

Signed and Sealed this twenty-seventh Day of April 1976

[SEAL]

Attest:

RUTH C. MASON
Attesting Officer

C. MARSHALL DANN
Commissioner of Patents and Trademarks